United States Patent
Burd

(10) Patent No.: US 12,314,033 B2
(45) Date of Patent: *May 27, 2025

(54) ADDITIVE MANUFACTURING SYSTEM AND METHOD OF MANUFACTURE

(71) Applicant: RTX Corporation, Farmington, CT (US)

(72) Inventor: Steven W. Burd, Cheshire, CT (US)

(73) Assignee: RTX Corporation, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/424,100

(22) Filed: Jan. 26, 2024

(65) Prior Publication Data

US 2024/0168458 A1 May 23, 2024

Related U.S. Application Data

(60) Division of application No. 16/743,528, filed on Jan. 15, 2020, now Pat. No. 11,921,490, which is a
(Continued)

(51) Int. Cl.
| | |
|---|---|
| *G05B 19/4099* | (2006.01) |
| *B22F 5/00* | (2006.01) |
| *B22F 7/06* | (2006.01) |
| *B22F 10/25* | (2021.01) |
| *B22F 10/28* | (2021.01) |
| *B29C 64/386* | (2017.01) |
| *B29C 64/40* | (2017.01) |

(Continued)

(52) U.S. Cl.
CPC .......... *G05B 19/4099* (2013.01); *B22F 5/009* (2013.01); *B22F 7/062* (2013.01); *B22F 10/28* (2021.01); *B29C 64/386* (2017.08); *B29C 64/40* (2017.08); *B33Y 10/00* (2014.12); *B33Y 50/00* (2014.12); *B22F 10/25* (2021.01); *B33Y 50/02* (2014.12); *G05B 2219/35134* (2013.01); *G05B 2219/49007* (2013.01); *G05B 2219/49014* (2013.01); *Y02P 10/25* (2015.11)

(58) Field of Classification Search
None
See application file for complete search history.

(56) References Cited

U.S. PATENT DOCUMENTS

| | | |
|---|---|---|
| 4,581,053 A | 4/1986 | Prewo et al. |
| 5,819,388 A | 10/1998 | Salm |

(Continued)

FOREIGN PATENT DOCUMENTS

| | | |
|---|---|---|
| CN | 102655996 A | 9/2012 |
| WO | 2012166552 A1 | 12/2012 |

*Primary Examiner* — Sean Shechtman
(74) *Attorney, Agent, or Firm* — Bachman & LaPointe, P.C.

(57) ABSTRACT

An additive manufacturing method includes segmenting a CAD file of a component along a build interface to define at least a first component segment and a second component segment, each of the first component segment and the second component segment sized to fit within an additive manufacturing build chamber; additive manufacturing the first component segment and the second component segment within the build chamber; and bonding the first component segment and the second component segment to form the component.

13 Claims, 8 Drawing Sheets

Related U.S. Application Data continuation of application No. 14/900,336, filed as application No. PCT/US2014/044380 on Jun. 26, 2014, now Pat. No. 10,569,473.

(60) Provisional application No. 61/840,517, filed on Jun. 28, 2013.

(51) Int. Cl.
*B33Y 10/00* (2015.01)
*B33Y 50/00* (2015.01)
*B33Y 50/02* (2015.01)

(56) References Cited

U.S. PATENT DOCUMENTS

| | | |
|---|---|---|
| 9,511,544 B2 | 12/2016 | Hemingway et al. |
| 10,569,473 B2 * | 2/2020 | Burd ................. B22F 10/28 |
| 11,921,490 B2 * | 3/2024 | Burd ................. G05B 19/4099 |
| 2002/0152715 A1 | 10/2002 | Rotheroe |
| 2007/0013724 A1 | 1/2007 | Swift |
| 2007/0050979 A1 | 3/2007 | Huskamp et al. |
| 2007/0051704 A1 * | 3/2007 | Husmann ............... B33Y 70/00 219/121.6 |
| 2009/0183850 A1 | 7/2009 | Morrison et al. |
| 2009/0272123 A1 | 11/2009 | Sadil et al. |
| 2010/0305742 A1 | 12/2010 | Twelves, Jr. et al. |
| 2012/0232857 A1 | 9/2012 | Fisker et al. |
| 2013/0112672 A1 | 5/2013 | Keremes et al. |
| 2014/0065343 A1 | 3/2014 | Hess et al. |
| 2014/0257547 A1 | 9/2014 | Bachrach et al. |

* cited by examiner

ADDITIVE MANUFACTURING SYSTEM AND METHOD OF MANUFACTURE

CROSS-REFERENCE TO RELATED APPLICATION

This application is a divisional of U.S. patent application Ser. No. 16/743,528, filed Jan. 15, 2020, which is a continuation of U.S. patent application Ser. No. 14/900,336, filed Dec. 21, 2015, now U.S. Pat. No. 10,569,473, issued Feb. 25, 2020, which is a 371 of International application PCT/US2014/044380, filed Jun. 26, 2014, which claims priority to U.S. Patent Appln. Ser. No. 61/840,517, filed Jun. 28, 2013, which is hereby incorporated herein by reference in its entirety.

BACKGROUND

The present disclosure relates generally to additive manufacturing systems and processes.

Additive manufacturing processes typically use 3D CAD data and an energy source such as high powered laser beam to form three-dimensional metal parts by fusing fine metallic powders within a build chamber typically of about 15 inches (381 mm) in the X, Y and Z dimensions.

Many aerospace components such as struts, supports, leading edge components and trailing edge components that are attached to engine inlet sections, fan stators, compressor stators, guide vanes, intermediate cases, mid-turbine frames, turbine exhaust cases, augmentors, exhaust mixers and many others tend to include thin walls that form enclosures with cooling holes therethrough. These aerospace components also require fastening schemes at their outer and/or inner extents and/or upstream or downstream ends.

The internal and external geometries of such aerospace components may complicate accurate manufacturing thereof and require subsequent machining. Additionally, the attachment areas of such aerospace components may require further hardware to satisfy orientation requirements. The size of such aerospace components may also complicate manufacture thereof by additive manufacturing processes.

SUMMARY

An additive manufacturing method is provided according to one disclosed non-limiting embodiment of the present disclosure. This method includes: electronically segmenting an electronic file representative of a component along a build interface to define at least a first component segment and a second component segment; manufacturing the first component segment and the second component segment within an additive manufacturing build chamber; and bonding the first component segment and the second component segment to form the component.

In a further embodiment of the present disclosure, the method may include simultaneously additive manufacturing the first component segment and the second component segment within the build chamber.

In a further embodiment of any of the foregoing embodiments of the present disclosure, the method may include adding sacrificial material to the first component segment and/or the second component segment beyond the build interface.

In a further embodiment of any of the foregoing embodiments of the present disclosure, the method may include removing the sacrificial material during the bonding.

In a further embodiment of any of the foregoing embodiments of the present disclosure, the method may include removing the sacrificial material during a machining operation.

In a further embodiment of any of the foregoing embodiments of the present disclosure, the method may include adding thickness to the first component segment and/or the second component segment along the build interface.

In a further embodiment of any of the foregoing embodiments of the present disclosure, the method may include defining the build interface along an internal rib.

In a further embodiment of any of the foregoing embodiments of the present disclosure, the method may include defining the build interface around an aperture.

In a further embodiment of any of the foregoing embodiments of the present disclosure, the method may include defining the build interface across the component.

In a further embodiment of any of the foregoing embodiments of the present disclosure, the method may include defining the build interface transverse to a longitudinal length of the component.

In a further embodiment of any of the foregoing embodiments of the present disclosure, the method may include defining the build interface along a span of the component.

In a further embodiment of any of the foregoing embodiments of the present disclosure, the electronic file may be a computer aided design (CAD) file.

In a further embodiment of any of the foregoing embodiments of the present disclosure, the bonding of the first component segment and the second component segment may include welding.

An additive manufacturing method is provided according to another disclosed non-limiting embodiment of the present disclosure. This method includes electronically segmenting an electronic file representative of a component along a build interface to define at least a first component segment and a second component segment, where the first component segment and the second component segment are each sized to fit within an additive manufacturing build chamber. The method also includes simultaneously additive manufacturing the first component segment and the second component segment within the build chamber.

In a further embodiment of any of the foregoing embodiments of the present disclosure, the method may include bonding the first component segment and the second component segment to form the component.

In a further embodiment of any of the foregoing embodiments of the present disclosure, the bonding of the first component segment and the second component segment may include welding.

In a further embodiment of any of the foregoing embodiments of the present disclosure, the method may include adding sacrificial material to the first component segment and/or the second component segment beyond the build interface during the additive manufacturing.

In a further embodiment of any of the foregoing embodiments of the present disclosure, the method may include removing the sacrificial material during the bonding.

A component is provided manufactured by an additive process according to another disclosed non-limiting embodiment of the present disclosure. The additive process may include, but is not limited to, one or more of the method steps set forth above. The component may be or include an augmentor vane.

In a further embodiment of any of the foregoing embodiments of the present disclosure, the additive process or method may include: adding sacrificial material to the first component segment and/or the second component segment beyond the build interface; and bonding the first component segment and the second component segment such that the sacrificial material is consumed.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
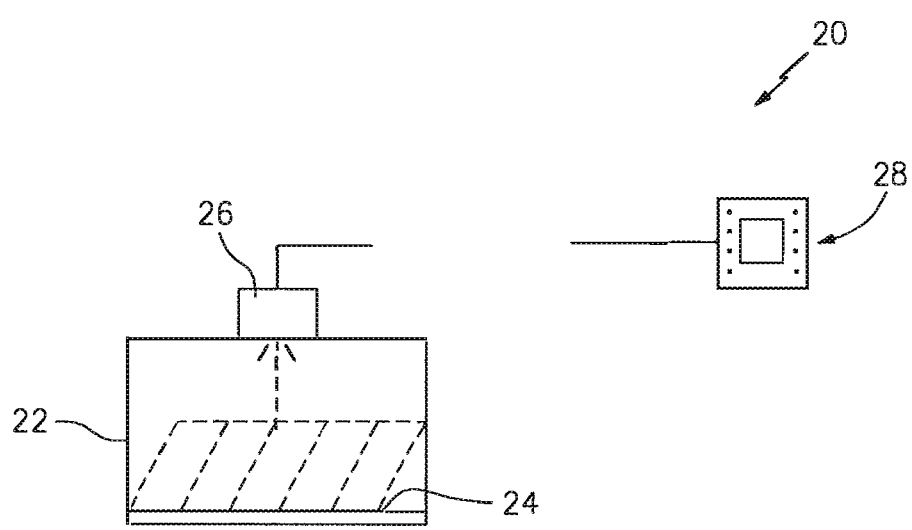
FIG. 1 is a general schematic view of an additive manufacturing system.

FIG. 1 schematically illustrates an additive manufacturing system 20. The system 20 generally includes a build chamber 22 with a powder bed 24, one or more energy sources 26 such as a laser and a control 28 (all illustrated schematically). It should be appreciated that as defined herein, "additive manufacturing" processes include but are not limited to, selective laser melting (SLM), Direct Metal Laser Sintering (DMLS), Powder-Bed Electron Beam Melting (EBM), Electron Beam Free Form Fabrication (EBF3), Laser Engineered Net Shape (LENS) and others. It should be also appreciated that various components and subsystems may additionally or alternatively be provided.

For example, selective laser melting (SLM) is a free form fabrication, powder-bed manufacturing process. Hardware is built up in a layer-by-layer fashion with a process that starts by slicing a CAD file into about 20 μm (0.8 mils) or larger thick layers. This altered CAD file is loaded into the control 26 which builds the hardware one layer at a time, as defined by the new CAD file. Electron beam melting (EBM) is a powder bed additive manufacturing process. EBM, however, uses an electron beam to melt powdered metal deposited layer-by-layer in a vacuum to build up three dimensional parts. A CAD file is sliced into 50 μm or 70 μm (2.0 mils or 2.8 mils) thick layers, stored as STL files, which are then loaded into the EBM machine. An electron beam is created by running a current through a tungsten filament, to form a potential across it to rip off the electrons. The electrons are steered and focused to a build plate by magnetic fields. The lack of moving parts allows for very fast scanning speeds (e.g., up to 8000 mis). Examples of such systems are manufactured by Concept Laser of Lichtenfels, DE and EOS of Munich, DE, e.g. direct metal laser sintering or electron beam melting. It should be appreciated that various other example additive manufacturing systems may be utilized herewith.

The additive manufacturing system 20 sequentially builds-up layers of atomized alloy powder material such as, but not limited to, 625 Alloy, 718 Alloy, 230 Alloy, stainless steel, tool steel, cobalt chrome, titanium, nickel, aluminum and others in atomized powder material form. Alloys such as 625, 718 and 230 may be used for parts that operate in high temperature environments, such as, for example, environments typically encountered by aerospace and gas turbine engine components.

Figure 2:
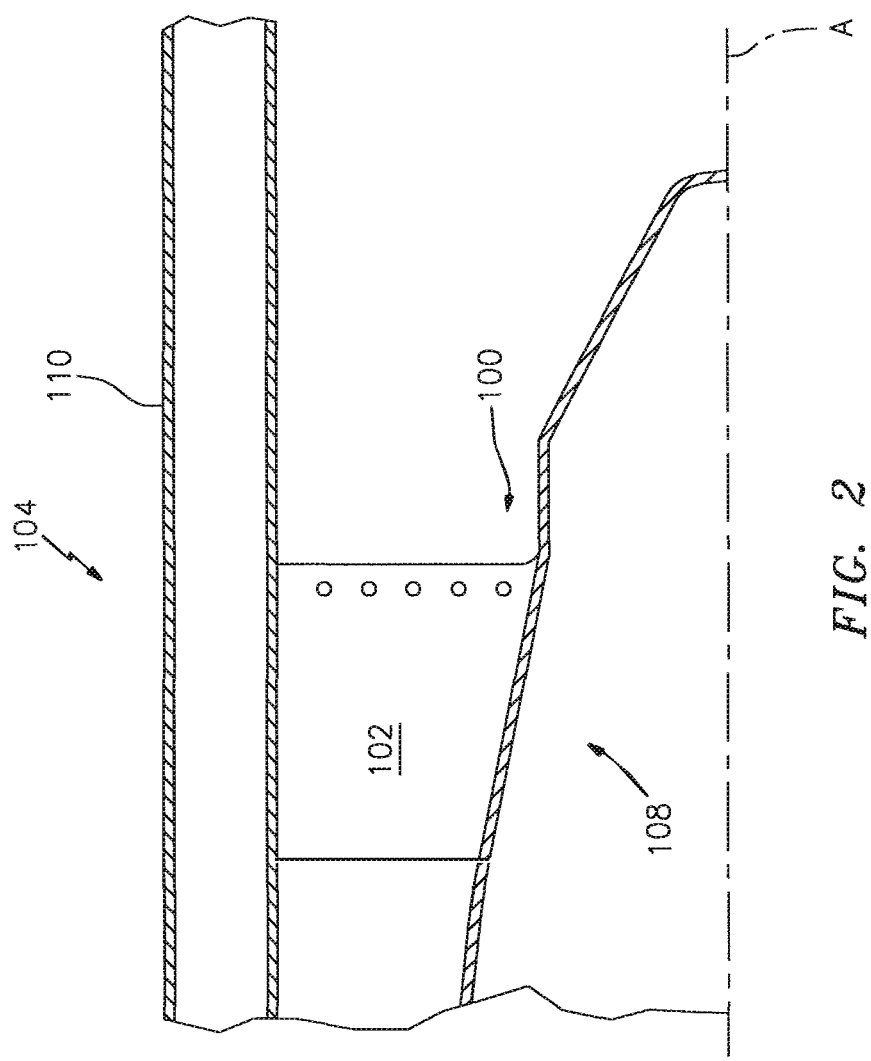
FIG. 2 is an expanded sectional view of an augmentor vane of an augmentor section.
Figure 3:
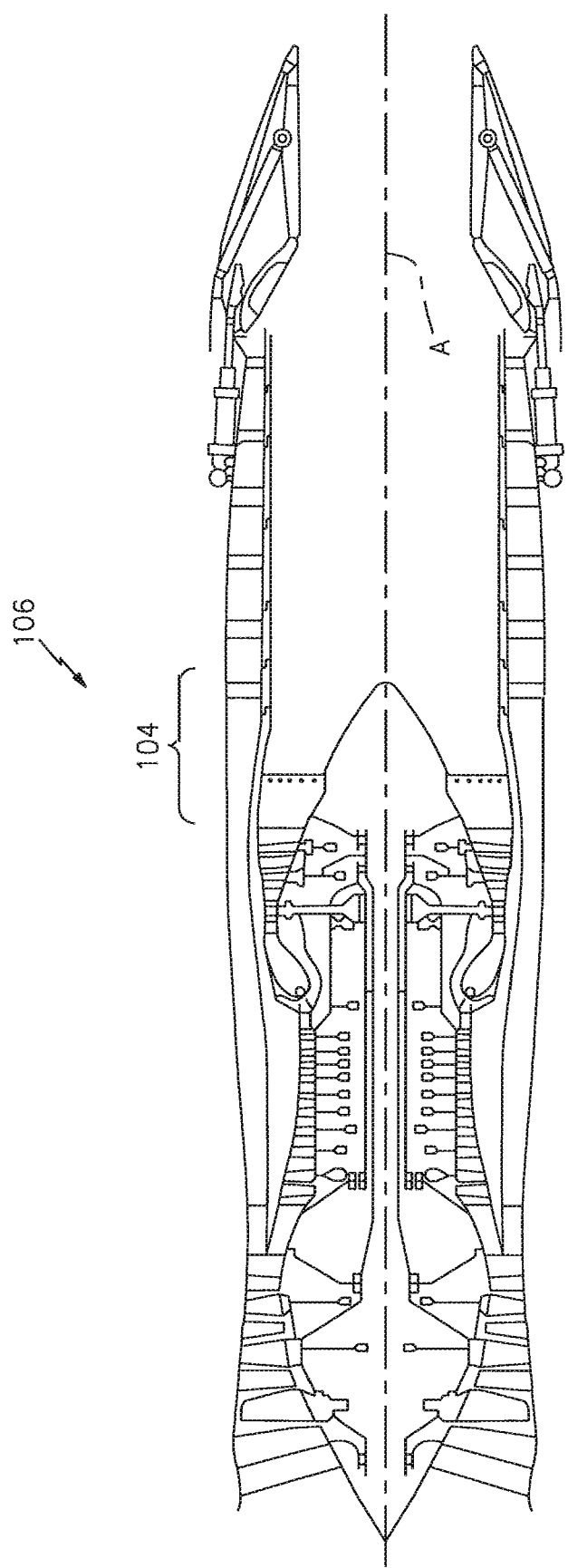
FIG. 3 is a general schematic view of an exemplary gas turbine engine embodiment for use with the augmentor vane of FIG. 2.

With reference to FIG. 2, one example aerospace component 100 is a trailing edge of each vane 102 in, for example, an augmenter section 104 or turbine section of a gas turbine engine 106 (illustrated schematically in FIG. 3). The vanes 102 are circumferentially arrayed and are fastened radially between a center body 108 and a turbine exhaust case (TEC) 110. Due in part to the harsh environment, the strict alignment requirements for associated fastening schemes, the relatively thin walls, the relatively complex internal structures and the requirement for numerous cooling holes therethrough, such an example aerospace component 100—and many others—are beneficially manufactured via additive manufacturing processes but for the significant size of such an aerospace component 100 which prevents manufacture in a conventional build chamber. That is, the aerospace component 100 may be modified by an additive manufacturing method 200 (see FIG. 4) which facilitates growing the aerospace component 100 within a smaller build chamber or permits the aerospace component 100 to be additively manufactured.

Figure 4:
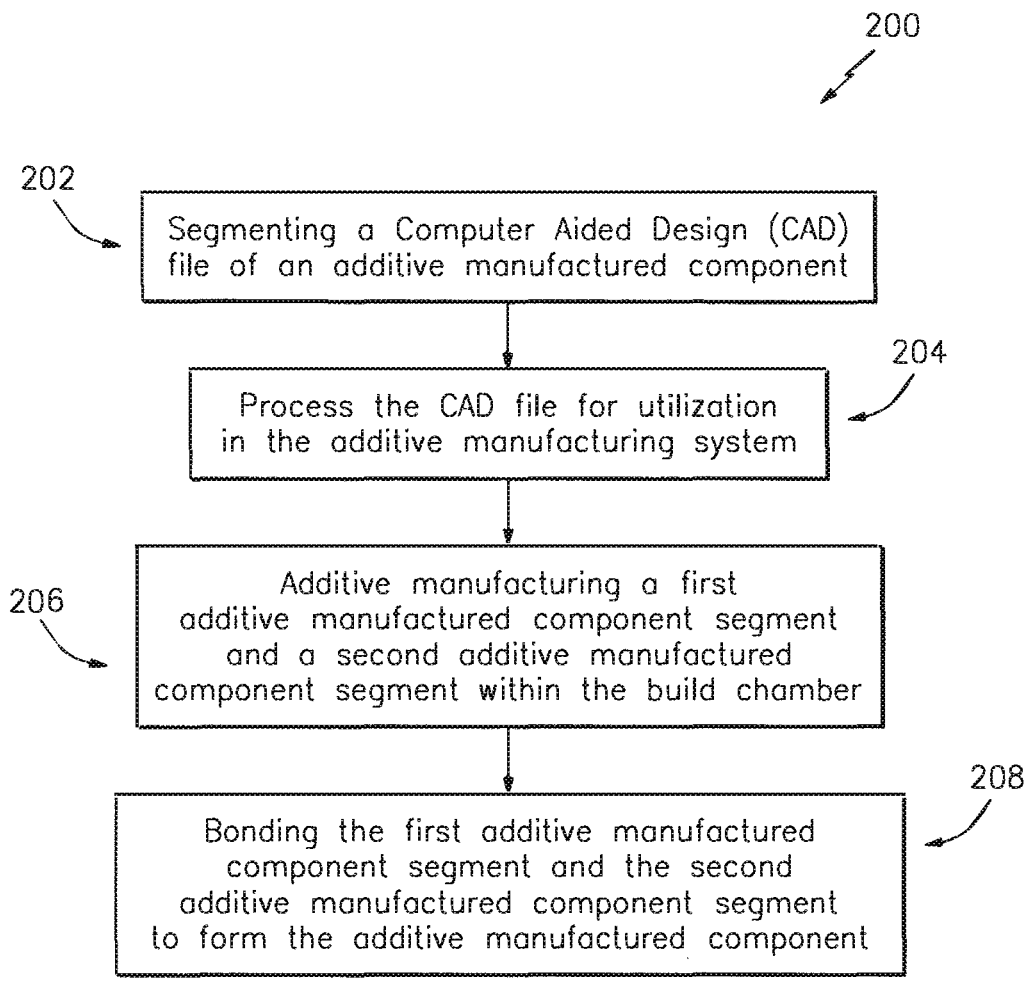
FIG. 4 is a flow diagram of an additive manufacturing method.
Figure 5:
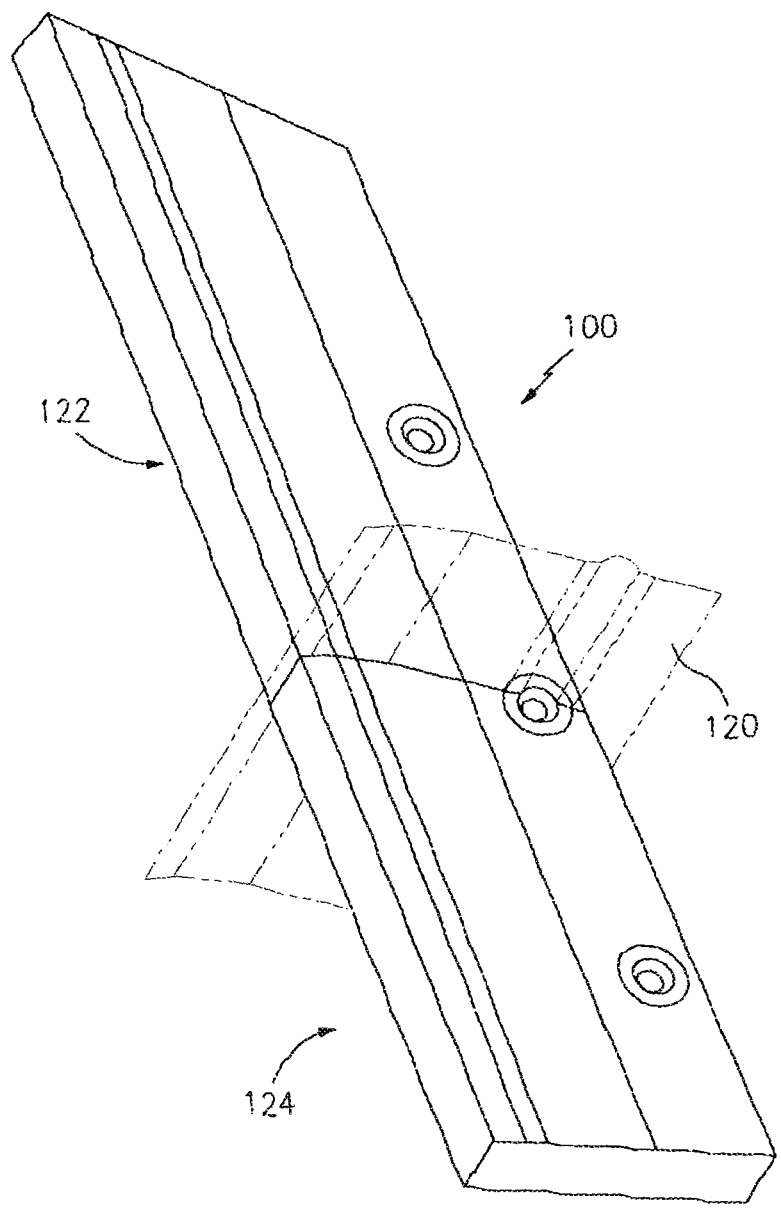
FIG. 5 is a schematic perspective view of an additive manufactured component with a build interface defined therethrough to define at least a first additive manufactured component segment and a second additive manufactured component segment.
Figure 6:
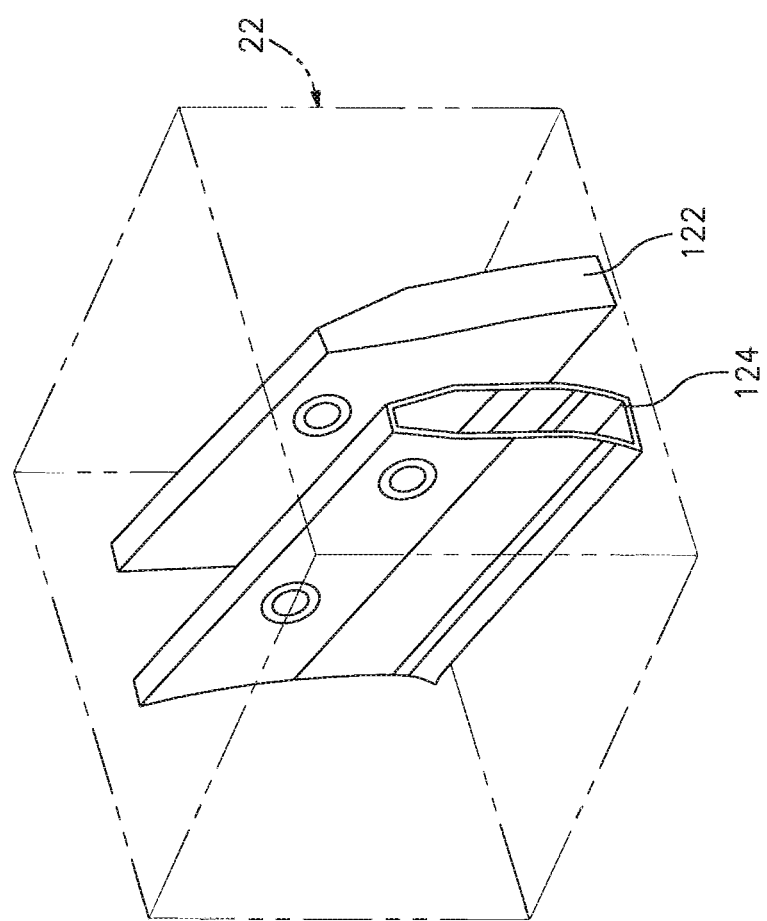
FIG. 6 is a schematic perspective view of the first additive manufactured component section and the second additive manufactured component segment within a build chamber.

With reference to FIG. 4, the additive manufacturing method 200 initially includes segmenting a Computer Aided Design (CAD) file of the additive manufactured component 100 along a build interface 120 (illustrated schematically in FIG. 5) to define at least a first additive manufactured component segment 122 and a second additive manufactured component segment 124, each of which are sized to fit within the additive manufacturing build chamber 22 (see FIG. 6; step 202) which is of a predetermined size. It should be appreciated that various CAD software packages and systems may be utilized to segment prior designed or specifically generated CAD files of the additive manufactured component 100 along the build interface 120. That is, the build interface 120 may be subsequently defined for a previously designed additive manufactured component 100 or determined concurrently with the design of the additive manufactured component 100. Moreover, the build interface 120 may be defined for a non-additively manufactured component because of the multi-section constructed permits the component to be additively manufactured.

The build interface 120 is defined to minimize operational impact upon the aerospace component 100. In one disclosed non-limiting embodiment, the build interface 120 may be defined, for example, along an internal rib 126 (see FIG. 7).

Figure 7:
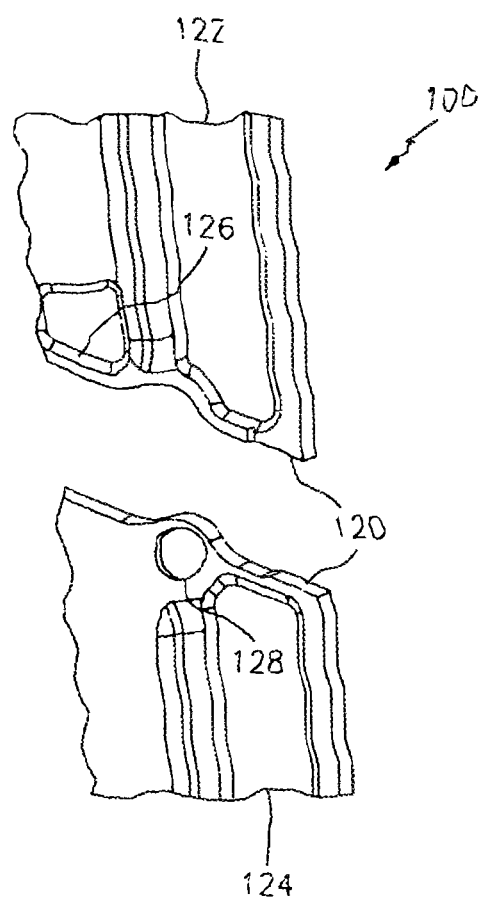
FIG. 7 is an expanded schematic perspective view of first and second component segments which define a build interface.

In another disclosed non-limiting embodiment, the build interface 120 may be, for example, defined around an aperture 128 (see FIG. 7). It should be appreciated that various lateral, longitudinal and other orientations may be defined by the build interface 120 such that two or more segments 122, 124 of the additive manufactured component 100 may be defined to fit within the build chamber 22.

Figure 8:
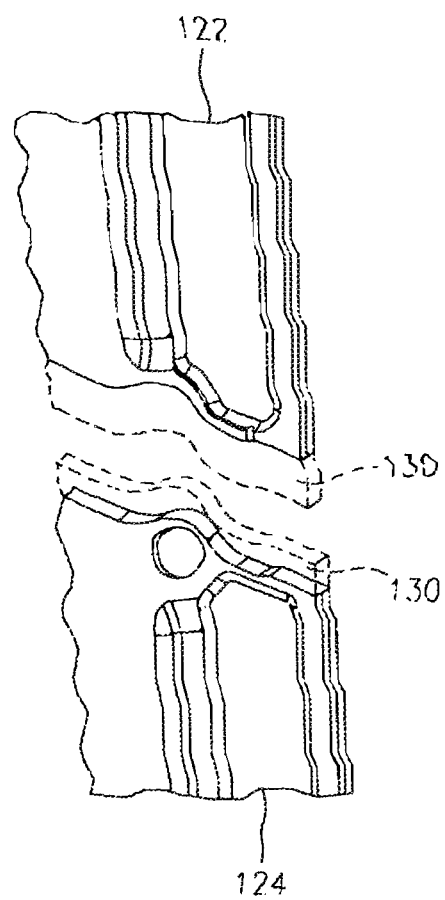
FIG. 8 is an expanded schematic perspective view of first and second component segments which define a build interface with material extending beyond the build interface.

In yet another disclosed non-limiting embodiment, sacrificial material 130 is added to one or more of the segments 122, 124 beyond (e.g., longitudinally and/or laterally beyond) the build interface 120 (see FIG. 8). The sacrificial material 130 thereby results in segments which are generally larger, thicker and/or of dimensions different than that of the final additive manufactured component 100. The sacrificial material 130 is thus proximate the build interface 120. Bonding of the segments 122, 124 such as by welding will thereby consume the sacrificial material 130 such that the final additive manufactured component 100 is of the desired dimensions and comprised of the segments 122, 124 bonded at least substantially along the build interface. Other consumptive processes such as machining, datuming and others may also benefit from use of the sacrificial material 130.

The CAD file is then processed for utilization in the additive manufacturing system 20 (step 204). That is, the CAD file is typically converted into, for example, a STereoLithography (STL) file, which is a file format native to the additive manufacturing system 20. It should be further noted that a computing device may be used to implement various functionality, such as operation of the additive manufacturing system 20, processing of the Computer Aided Design (CAD) file, conversion of the STereoLithography (STL) file, etc. It should be appreciated that various electronic files will benefit herefrom. In terms of hardware architecture, such a computing device can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

Next, the first additive manufactured component segment 122 and the second additive manufactured component segment 124 are additive manufactured within the build chamber 22 (Step 206). The first additive manufactured component segment 122 and the second additive manufactured component segment 124 may, in one disclosed non-limiting embodiment, be manufactured simultaneously or, alternatively, multiple first additive manufactured component segments 122 are manufactured simultaneously, then multiple second additive manufactured component segments 124 are manufactured simultaneously. That is, the segments 122, 124 may be built in the build chamber 22 in the most efficient manner.

Finally, the first additive manufactured component segment 122 and the second additive manufactured component segment 124 are bonded to form the additive manufactured component 100 (step 208). "Bonded" as utilized herein include various permanent attachment methods such as welding, brazing and others. As aforementioned, bonding of the segments 122, 124, such as by welding, will consume the sacrificial material 130 that has been included such that the final additive manufactured component 100 is of the desired dimensions once bonded. It should also be appreciated that the segments 122, 124 may alternatively be utilized in combination with other details which may be manufactured through conventional machined details or castings to form a hybrid component.

The use of the terms "a" and "an" and "the" and similar references in the context of the description herein (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the structural member and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described and claimed, it should be understood that the steps of the sequences and methods described herein may be performed in any order, separated or combined unless otherwise indicated and will still benefit from the present disclosure.

The foregoing description is exemplary rather than defined by the limitations within. Various non-limiting embodiments are disclosed herein. However, one of ordinary skill in the art will recognize that various modifications and variations in light of the above teachings will fall within the scope of the appended claims. It is therefore to be understood that within the scope of the appended claims, the disclosure may be practiced other than as specifically described. For that reason, the appended claims should be studied to determine true scope and content.

What is claimed is:

1. A method for manufacturing a hybrid component, comprising:

selecting a build interface in an electronic file for a portion of the hybrid component which is to be additively manufactured in an additive manufacturing build chamber, wherein the portion of the hybrid component comprises a one-piece previously designed additively manufactured part larger than the additive manufacturing build chamber;

electronically segregating the electronic file representative of the portion of the hybrid component along the build interface to define at least a first additively manufactured component segment and a second additively manufactured component segment, each of the first additively manufactured component segment and the second additively manufactured segment are sized to fit simultaneously within the additive manufacturing build chamber;

simultaneously additive manufacturing the first additively manufactured component segment and the second additively manufactured component segment within the additive manufacturing build chamber; and bonding the first additively manufactured component segment and the second additively manufactured component segment outside of the additive manufacturing build chamber to form the portion of the hybrid component which is to be additively manufactured, and bonding the portion of the hybrid component to a non-additively manufactured part to form the hybrid component wherein the hybrid component is selected from the group comprising trailing edge components that are attached to engine inlet sections, fan stators, compressor stators, turbine exhaust cases and exhaust mixers.

2. The method as recited in claim 1, further comprising modifying at least one of the first additively manufactured component segment and the second additively manufactured component segment to include a sacrificial material portion to at least one of the first additively manufactured component segment and the second additively manufactured component segment beyond the build interface.

3. The method as recited in claim 2, further comprising removing the sacrificial material portion during the bonding.

4. The method as recited in claim 1, further comprising modifying the first additively manufactured component segment and/or the second additively manufactured component segment to add thickness within the first additively manufactured component segment and/or the second additively manufactured component segment along the build interface.

5. The method as recited in claim 1, wherein selecting the build interface comprises defining the build interface along an internal rib.

6. The method as recited in claim 1, wherein selecting the build interface comprises defining the build interface at least partially around an aperture.

7. The method as recited in claim 1, wherein selecting the build interface comprises defining the build interface across the component.

8. The method as recited in claim 1, wherein selecting the build interface comprises defining the build interface transverse to a longitudinal length of the component.

9. The method as recited in claim 1, wherein selecting the build interface comprises defining the build interface at least partially around an aperture of the one-piece previously designed additively manufactured part.

10. The method as recited in claim 9, further comprising defining the build interface across the component.

11. The method as recited in claim 9, further comprising defining the build interface transverse to a longitudinal length of the component.

12. The method as recited in claim 1, wherein the bonding of the first additively manufactured component segment and the second additively manufactured component segment includes welding.

13. The method as recited in claim 1, wherein the additive manufacturing step comprises powder bed additive manufacturing the first additively manufactured component segment and the second additively manufactured component segment within the additive manufacturing build chamber based on the defined first additively manufactured component segment and second additively manufactured component segment.

* * * * *